US008731539B2

United States Patent
Lin

(10) Patent No.: US 8,731,539 B2
(45) Date of Patent: May 20, 2014

(54) METHOD, SYSTEM AND MOBILE TERMINAL FOR CONFIGURING ACCESS POINT AND APPLICATION INFORMATION

(75) Inventor: Yufei Lin, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/642,766

(22) PCT Filed: Jul. 20, 2010

(86) PCT No.: PCT/CN2010/075324
§ 371 (c)(1),
(2), (4) Date: Oct. 22, 2012

(87) PCT Pub. No.: WO2011/134205
PCT Pub. Date: Nov. 3, 2011

(65) Prior Publication Data
US 2013/0040630 A1    Feb. 14, 2013

(30) Foreign Application Priority Data

Apr. 30, 2010   (CN) .......................... 2010 1 0160594

(51) Int. Cl.
*H04W 4/12*    (2009.01)
(52) U.S. Cl.
USPC ........ 455/419; 455/418; 455/466; 455/552.1; 370/343
(58) Field of Classification Search
USPC ................ 455/419, 418, 466, 552.1; 370/343
See application file for complete search history.

(56) References Cited

U.S. PATENT DOCUMENTS 7,752,292 B1 * 7/2010 Katzer .......................... 709/222
7,966,387 B1 * 6/2011 Katzer .......................... 709/222
(Continued)

FOREIGN PATENT DOCUMENTS

CN    1717098 A    1/2006
CN    101094472 A    12/2007
(Continued)

OTHER PUBLICATIONS

International Search Report in international application No. PCT/CN2010/075324, mailed on Dec. 30, 2010.
(Continued)

*Primary Examiner* — Jinsong Hu
*Assistant Examiner* — Jean Chang
(74) *Attorney, Agent, or Firm* — Oppedahl Patent Law Firm LLC

(57) ABSTRACT

The disclosure discloses a method, a system and a mobile terminal for configuring access point and application information. The method includes: a sending-party mobile terminal sends a configuration short message containing the access point and application information in a current network to a receiving-party mobile terminal in the same network; the receiving-party mobile terminal receives the configuration short message sent by the sending-party mobile terminal, extracts the access point and application information from the configuration short message, and performs a local configuration according to the extracted access point and application information. By adopting the disclosure, the defects in the existing way of configuring the access point and application information can be complemented; and after the mobile terminal joins in the network, whether the Over-The-Air-Programming (OTAP) is supported by the server or not, it is possible to set the access point and application information required by the current network for the mobile terminal conveniently and quickly, so as to perform services such as the multimedia messaging service and the Internet accessing service normally.

9 Claims, 3 Drawing Sheets

(56) References Cited

U.S. PATENT DOCUMENTS

| | | | |
|---|---|---|---|
| 2005/0090239 A1* | 4/2005 | Lee et al. | 455/418 |
| 2005/0198221 A1* | 9/2005 | Manchester et al. | 709/220 |
| 2007/0004391 A1* | 1/2007 | Maffeis | 455/418 |
| 2007/0019602 A1* | 1/2007 | Wong et al. | 370/343 |
| 2009/0325615 A1* | 12/2009 | McKay et al. | 455/466 |
| 2009/0327398 A1* | 12/2009 | Campbell et al. | 709/202 |
| 2010/0191608 A1* | 7/2010 | Mikkelsen et al. | 705/26 |
| 2010/0227691 A1* | 9/2010 | Karsten | 463/42 |
| 2010/0279733 A1* | 11/2010 | Karsten et al. | 455/552.1 |

FOREIGN PATENT DOCUMENTS

| | | |
|---|---|---|
| CN | 101237466 A | 8/2008 |
| CN | 101267631 A | 9/2008 |

OTHER PUBLICATIONS

English Translation of the Written Opinion of the International Search Authority in international application No. PCT/CN2010/075324, mailed on Dec. 30, 2010.

Supplementary European Search Report in European application No. EP 10850536.3, mailed on Apr. 16, 2013.

* cited by examiner

METHOD, SYSTEM AND MOBILE TERMINAL FOR CONFIGURING ACCESS POINT AND APPLICATION INFORMATION

TECHNICAL FIELD

The disclosure relates to the field of databases, in particular to a method, a system and a mobile terminal for configuring access point and application information.

BACKGROUND

At present, many mobile phones can support services, such as accessing the Internet, sending and receiving multimedia messages and the like, in the case that it is necessary to perform corresponding configuration for the mobile phone according to access point and application information provided by an operator.

So far, configuring the access point and application information can be implemented by the following two ways: one is that the configuration is performed by means of configuration information received from a server through Over-The-Air-Programming (OTAP); the other is that the configuration is manually performed by a user.

Both ways have defects: the first way needs the support of the server; the second way requires the user to know the access point and application information in advance, wherein it is difficult to record the configuration information correctly and quite inconvenient for inputting the information, and for a roaming user, he may not know the access point and application information corresponding to each operator.

SUMMARY

Based on above analysis, the purpose of the disclosure is to provide a method, a system and a mobile terminal for configuring access point and application information, so as to complement the defects in the existing way of configuring the access point and application information.

The purpose of the disclosure is mainly realized through the technical solution below.

The disclosure provides a method for configuring access point and application information, which includes:

the access point and application information in a current network is carried in a configuration short message by a sending-party mobile terminal, and the configuration short message is sent to a receiving-party mobile terminal in the same network by the sending-party mobile terminal;

the receiving-party mobile terminal receives the configuration short message sent by the sending-party mobile terminal, extracts the access point and application information from the configuration short message, and performs a local configuration according to the extracted access point and application information.

The disclosure also provides a system for configuring access point and application information, which includes: a sending-party mobile terminal and a receiving-party mobile terminal, wherein the sending-party mobile terminal is configured to: obtain the access point and application information in a current network, carry the access point and application information in a configuration short message, and send the configuration short message to the receiving-party mobile terminal in the same network;

the receiving-party mobile terminal is configured to: extract the access point and application information in the configuration short message when receiving the configuration short message containing the access point and application information from the sending-party mobile terminal, and perform local configuration according to the extracted access point and application information.

The disclosure also provides a mobile terminal, which includes: a configuration short message generating module and/or a configuration short message processing module, wherein the configuration short message generating module is configured to: when the mobile terminal serves as a sending-party mobile terminal, obtain access point and application information in a current network, carry the access point and application information in a configuration short message, and send the configuration short message to a receiving-party mobile terminal in the same network;

the configuration short message processing module is configured to: when the mobile terminal serves as the receiving-party mobile terminal and receives the configuration short message containing the access point and application information from the sending-party mobile terminal, extract the access point and application information in the configuration short message, and perform local configuration according to the extracted access point and application information.

The disclosure has the following advantages:

the defects in the existing way of configuring the access point and application information can be complemented; after the mobile terminal joins in the network, whether the OTAP is supported by the server or not, the access point and application information required by the current network can be set for the mobile terminal conveniently and quickly; and services, such as the multimedia messaging service and Internet accessing service can be performed normally.

DETAILED DESCRIPTION OF THE DISCLOSURE

The preferred embodiments of the disclosure will be described in detail with reference to drawings below, wherein the drawings form a part of the application and are used for explaining the principle of the disclosure with the embodiments of the disclosure. In order to make it clear and simple, when the drawings and embodiments make the subject of the disclosure indefinable, known functions and structures described in detail in the disclosure will be omitted.

First, the method according to the embodiment of the disclosure will be described in details below with reference to FIG. 1 and FIG. 2.

Figure 1:
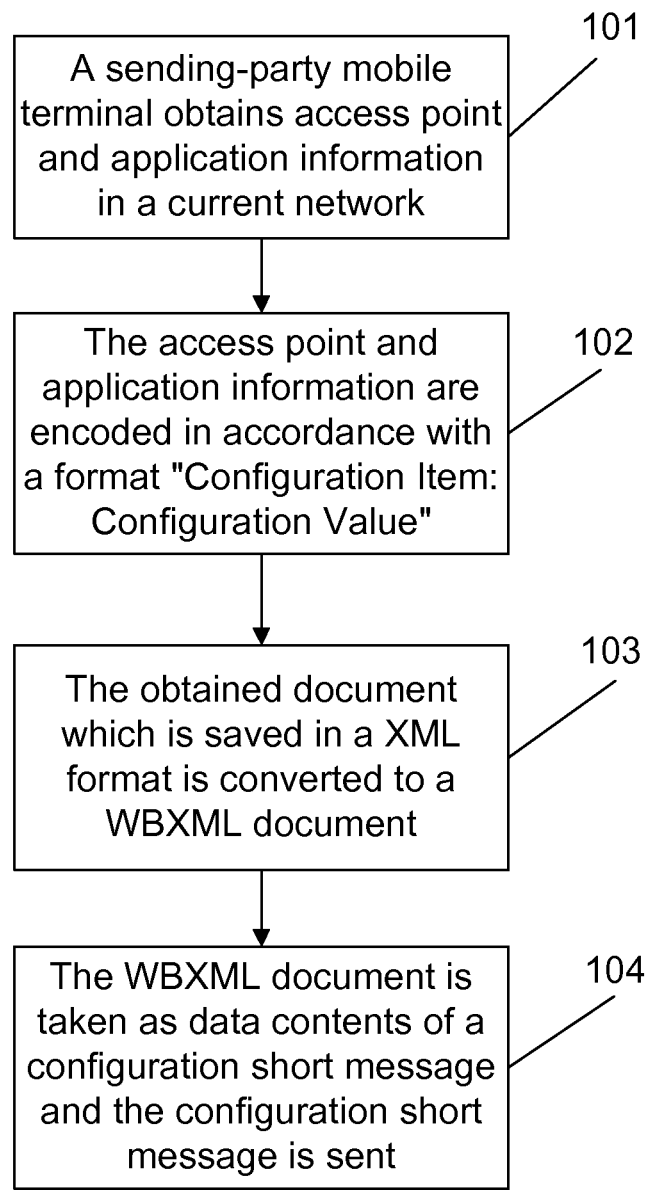
FIG. 1 is a schematic diagram showing a process of generating a configuration short message in a method according to an embodiment of the disclosure.

As shown in FIG. 1, FIG. 1 is a schematic diagram showing a process of generating a configuration short message in a method according to an embodiment of the disclosure, which includes the steps below.

Step 101, a sending-party mobile terminal obtains access point and application information in a current network, wherein since types of the sending-party mobile terminals and ways of saving the access point and application information are different, methods for obtaining the access point and application information in the current network are also different, and the method usually includes: an interface for configuration information saved in a flash of the mobile terminal is called to obtain the configuration information, or a configuration file in the mobile terminal is read directly to obtain the configuration information.

Step 102, the obtained access point and application information are encoded in accordance with a format "Configuration Item: Configuration Value" to obtain an access point and application information document, wherein the Extensible Markup Language (XML) is adopted for the encoding here, so that an XML document is generated.

Step 103, the obtained access point and application information document is compressed; in the embodiment of the disclosure, the obtained document which is saved in a XML format is converted to a Wireless Binary XML (WBXML) document, and the converted WBXML document is a binary data stream.

Step 104, a short message which is a "special type" is constructed, the short message is marked as a configuration short message which is different from common short messages and other short messages (for example, a display-only short message), and the compressed access point and application information document is taken as data contents of the configuration short message, so as to send the configuration short message to a receiving-party mobile terminal; in the embodiment of the disclosure, the binary data stream in the WBXML document obtained through the conversion is taken as the data contents of the configuration short message, the type of the short message is identified by a special configuration type, and then the short message is sent to the receiving-party mobile terminal in the same network.

Wherein, an example of the generated XML document is as follows:

```
<wap-provisioningdoc version="1.1">
<characteristic type="APN">
  <parm name="APNID" value="APN_MMS"/>
  <parm name="BEARER" value="GSM-GPRS"/>
  <parm name="NAP-ADDRESS" value="cmwap"/>
  <characteristic type="APNAUTHINFO">
    <parm name="AUTHTYPE" value="PAP"/>
    <parm name="AUTHNAME" value=""/>
    <parm name="AUTHSECRET" value=""/>
  </characteristic>
</characteristic>
<characteristic type="APPLICATION">
  <parm name="NAME" value="MMS"/>
  <parm name="APNID" value="APN_MMS"/>
  <parm name="MMSC" value="http://mmsc.monternet.com"/>
  <parm name="PROXY" value="10.0.0.172"/>
  <parm name="PORT" value="80"/>
</characteristic>
</wap-provisioningdoc>
```

Figure 2:
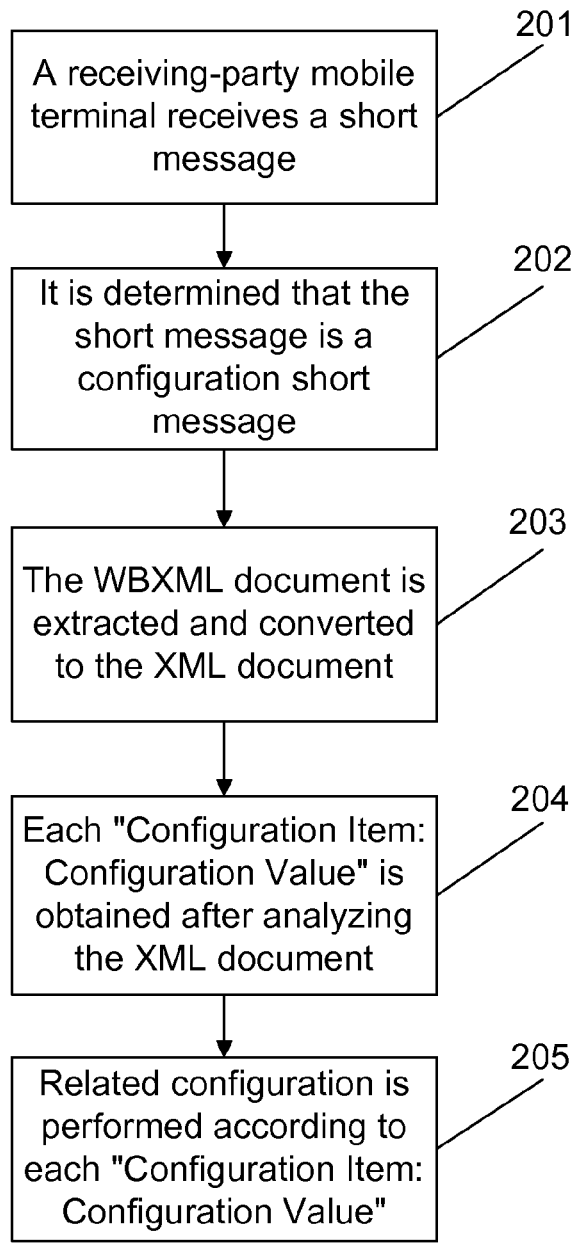
FIG. 2 is a schematic diagram showing a process of analyzing a configuration short message and performing local configuration by a receiving-party in a method according to an embodiment of the disclosure.

As shown in FIG. 2, FIG. 2 is a schematic diagram showing a process of analyzing a configuration short message and performing local configuration by a receiving-party in a method according to an embodiment of the disclosure, wherein the process includes the steps below.

Step 201, a receiving-party mobile terminal receives a short message.

Step 202, the receiving-party mobile terminal judges the type of the short message, and executes step 203 when it is determined that the short message is a configuration short message.

Step 203, the receiving-party mobile terminal extracts the data contents of the configuration short message, namely, the compressed access point and application information document, and decompresses the data contents; in the embodiment of the disclosure, the WBXML document is converted to the XML document.

Step 204, the decompressed access point and application information is analyzed to obtain each "Configuration Item: Configuration Value" corresponding to the access point and application information; in the embodiment of the disclosure, the XML document is analyzed.

Step 205, related configuration is performed according to each "Configuration Item: Configuration Value", wherein, a system function or an application configuration interface is called, and each "Configuration Item: Configuration Value" corresponding to the access point and application information is saved into a local flash or a configuration file of the receiving-party mobile terminal.

It should be noted that, in the embodiment of the disclosure, the purpose of compression is to minimize the size of the configuration information document, the compression of the configuration information document may also be not performed according to actual situations, and the method for the compression is not limited to the process of converting the XML document to the WBXML document, other compression ways applicable to the mobile terminal may also be adopted; in the embodiment of the disclosure, the purpose is to keep consistency with the access point and application information generated through OTAP. The decompression is an inverse processing of the compression, the implementing way of the decompression is corresponding to that of the compression and is not limited to the process of converting the WBXML document to the XML document.

In the embodiment, for a mobile terminal newly joined into the current network, whether the OTAP is supported by the server or not, the mobile terminal can receive the network configuration short message sent by the mobile terminal in the current network, perform configuration according to the configuration information in the configuration short message, and set the access point and application information required by the current network, so as to access the current network.

The system according to the embodiment of the disclosure will be described in details below with reference to FIG. 3.

Figure 3:
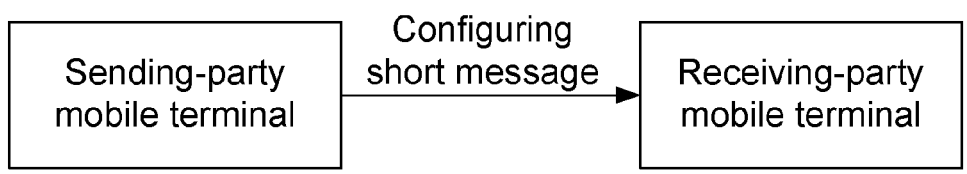
FIG. 3 is a schematic diagram showing a structure of a system according to an embodiment of the disclosure.

FIG. 3 is a schematic diagram showing a structure of a system according to an embodiment of the disclosure, as shown in FIG. 3 the system includes: a sending-party mobile terminal and a receiving-party mobile terminal;

wherein the sending-party mobile terminal is configured to obtain access point and application information in a current network, carrying the access point and application information in a configuration short message, and send the configuration short message to the receiving-party mobile terminal in the same network; in the embodiment of the disclosure, after the access point and application information in the current network is obtaining from the sending-party mobile terminal itself, the sending-party mobile terminal encodes the access point and application information to obtain a access point and application information document, constructs a short message which is identified by "special type", as the configuration short message, takes the access point and application information document as data contents of the configuration short message, and sends the configuration short message to the receiving-party mobile terminal in the same network.

The receiving-party mobile terminal is configured to, when receiving the configuration short message carrying the access point and application information from the sending-party mobile terminal, extract the access point and application information, and perform related configuration according to the extracted access point and application information, wherein after receiving the configuration short message which is a special configuration type, the receiving-party mobile terminal extracts the access point and application information document from the data contents of the configuration short message, decodes the extracted access point and application information document, and performs related configuration according to the decoded access point and application information.

In the embodiment, for a mobile terminal newly joined into the current network, whether the OTAP is supported by the server or not, the mobile terminal can receive the network configuration short message sent by the mobile terminal in the current network, perform configuration according to the configuration information in the configuration short message, and set the access point and application information required by the current network, so as to access the current network.

Finally, the mobile terminal according to the embodiment of the disclosure will be described in details below with reference to FIG. 4.

Figure 4:
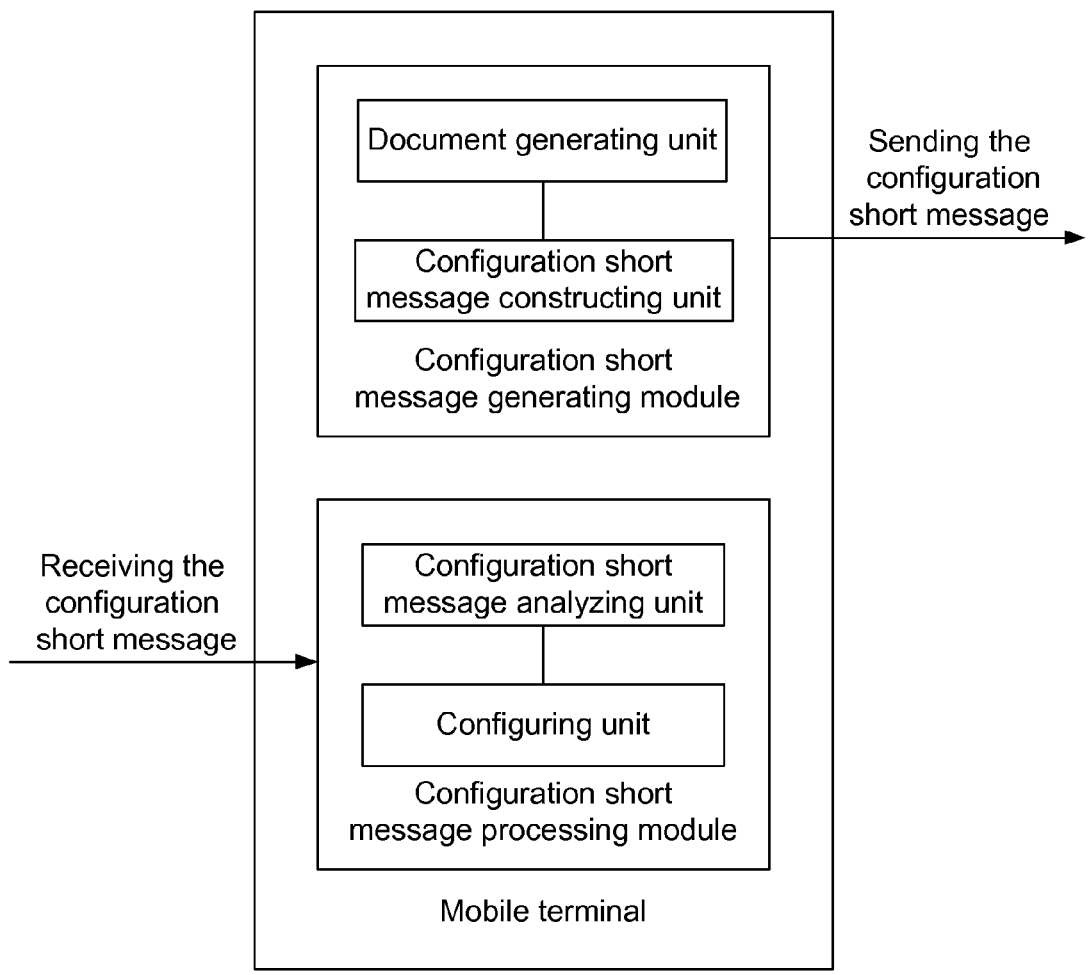
FIG. 4 is a schematic diagram showing a structure of a mobile terminal according to an embodiment of the disclosure.

As shown in FIG. 4, FIG. 4 is a schematic diagram showing a structure of a mobile terminal according to an embodiment of the disclosure, which includes: a configuration short message generating module and a configuration short message processing module, or one of the configuration short message generating module and the configuration short message processing module, wherein, the configuration short message generating module is configured to: when the mobile terminal serves as a sending-party mobile terminal, obtain access point and application information in a current network from the mobile terminal, carry the obtained access point and application information in a configuration short message, and send the configuration short message to a receiving-party mobile terminal in the same network, wherein when the mobile terminal serves as the sending-party mobile terminal, the configuration short message generating module obtains the access point and application information in the current network from the mobile terminal, encodes the access point and application information to obtain an access point and application information document, constructs the configuration short message which is the special configuration type, takes the access point and application information document as data contents of the configuration short message, and sends the configuration short message to the receiving-party mobile terminal in the same network.

The configuration short message generating module may further includes: a document generating unit and a configuration short message constructing unit, wherein, the document generating unit is configured to: when the mobile terminal serves as the sending-party mobile terminal, obtain the access point and application information in the current network from the mobile terminal, encode the access point and application information in accordance with a format "Configuration Item: Configuration Value" to obtain a XML document, and then convert the XML document into a WBXML document;

the configuration short message constructing unit is configured to: construct a configuration short message which is a special type, take a binary data stream in the WBXML document as data contents of the configuration short message, and send the configuration short message to the receiving-party mobile terminal in the same network.

The configuration short message processing module is further configured to: when the mobile terminal serves as the receiving-party mobile terminal, and receives the configuration short message containing the access point and application information from the sending-party mobile terminal, extract the access point and application information, perform related configuration according to the extracted access point and application information, wherein when the mobile terminal serves as the receiving-party mobile terminal, the configuration short message processing module extracts the access point and application information document from the data contents of the received configuration short message, decodes the access point and application information document, and performs the related configuration according to the decoded access point and application information.

The configuration short message processing module further includes: a configuration short message analyzing unit and a configuring unit, wherein, the configuration short message analyzing unit is configured to: when the mobile terminal serves as the receiving-party mobile terminal, judge the received short message, and extract the WBXML document from the data contents of the configuration short message when it is determined that the type of the received short message is the special configuration type;

the configuring unit is configured to: convert the WBXML document into the XML document, then decode the XML document to obtain each "Configuration Item: Configuration Value" corresponding to the access point and application information, and finally perform related configuration according to each "Configuration Item: Configuration Value", namely, a system function or an application configuration interface is called, and save each "Configuration Item: Configuration Value" corresponding to the access point and application information in a local flash or a configuration file of the receiving-party mobile terminal.

In the embodiment of the disclosure, the short message generated by the sending-party can be saved as text information; when the receiving-party configures the access point and the application according to the text information, the text information can be sent directly by the sending-party or forwarded by a third party.

In conclusion, the embodiment of the disclosure provides a method, a system and a mobile terminal for configuring access point and application information, which can complement the defects in the existing way of configuring the access point and application information; when the mobile terminal joins in a network, the access point and application information required by the current network can be set for the mobile terminal conveniently and quickly, whether the OTAP is supported by the server or not, and services such as the multimedia messaging service and the Internet accessing service can be performed normally. Wherein, the access point and application information is obtained from the terminal that has worked normally in the network, in this way, it can keep the access point and application information real and valid; the configuration short message is sent to the receiving-party mobile terminal from the sending-party mobile terminal, wherein the communication is realized between terminals, so that the support of the server is not needed; the mobile terminal receiving the configuration short message can process it flexibly, namely it is directly used for setting or forwarding; the configuration information is encoded in accordance with the WBXML in order to save a byte stream, and is sent through a text short message, therefore it is unnecessary to reconstruct the hardware or software of the existing mobile phone; even if the receiving-party mobile terminal has no function of realizing automatic configuration, the user may also set manually according to the contents of the text short message to finish the setting of the access point and application information.

All those described above are only preferred embodiments of the disclosure, and are not intend to limit the scope of the disclosure; many changes and replacements within the technical scope of the disclosure can be performed by those skilled in this art easily, and those changes and replacements should be included within the scope of the disclosure. Therefore, the scope of the disclosure should be subject to those described in the claims.

The invention claimed is:

1. A method for configuring access point and application information of a current network by using mobile-to-mobile direct communication, comprising:
    a sending-party mobile terminal sending a configuration short message containing the access point and application information of a current network to a receiving-party mobile terminal in the same network;
    the receiving-party mobile terminal receiving the configuration short message sent by the sending-party mobile terminal, extracting the access point and application information from the configuration short message, and performing a local configuration according to the extracted access point and application information;
    wherein the sending-party mobile terminal sending the configuration short message containing the access point and application information in the current network to the receiving-party mobile terminal in the same network comprises:
    the sending-party mobile terminal obtaining the access point and application information in the current network by reading its own configuration information, and encoding the access point and application information to obtain an access point and application information document;
    constructing a short message which is identified by "special type", as a configuration short message, taking an access point and application information document as data contents of the configuration short message, and sending the configuration short message to the receiving-party mobile terminal in the same network.

2. The method for configuring the access point and application information according to claim 1, wherein encoding the access point and application information to obtain the access point and application information document comprises:
    the sending-party mobile terminal encoding the access point and application information in accordance with a format "Configuration Item: Configuration Value" to obtain the access point and application information document.

3. The method for configuring the access point and application information according to claim 1, wherein the receiving-party mobile terminal receiving the configuration short message sent by the sending-party mobile terminal, extracting the access point and application information from the configuration short message, and performing a local configuration according to the extracted access point and application information comprises:
    the receiving-party mobile terminal extracting the access point and application information document from the data contents of the received configuration short message after determining that the received short message is the configuration short message, decoding the access point and application information document, and performing the local configuration according to the access point and application information obtained by the decoding.

4. The method for configuring the access point and application information according to claim 3, wherein performing the local configuration according to the access point and application information obtained by the decoding comprises:
    performing the local configuration according to the "Configuration Item: Configuration Value" corresponding to the access point and application information obtained by decoding the access point and application information document.

5. A system for configuring access point and application information by using mobile-to-mobile direct communication, comprising:
    a sending-party mobile terminal and a receiving-party mobile terminal, wherein the sending-party mobile terminal is configured to:
    obtain the access point and application information of a current network, carry the access point and application information in a configuration short message, and send the configuration short message to the receiving-party mobile terminal in the same network;
    the receiving-party mobile terminal is configured to:
    extract the access point and application information in the configuration short message when receiving the configuration short message containing the access point and application information from the sending-party mobile terminal, and perform local configuration according to the extracted access point and application information;
    wherein the sending-party mobile terminal is further configured to:
    obtain the access point and application information in the current network by reading the configuration information of the terminal, encode the access point and application information to obtain an access point and application information document, construct a short message which is identified by "special type", as the configuration short message, take the access point and application information document as data contents of the configuration short message, and send the configuration short message to the receiving-party mobile terminal in the same network.

6. A mobile terminal for configuring access point and application information by using mobile-to-mobile direct communication, comprising:
    a configuration short message generating module and/or a configuration short message processing module,
    wherein the configuration short message generating module is configured to:
    when the mobile terminal serves as a sending-party mobile terminal, obtain access point and application information of a current network, carry the access point and application information in a configuration short message, and send the configuration short message to a receiving-party mobile terminal in the same network;
    the configuration short message processing module is configured to:
    when the mobile terminal serves as the receiving-party mobile terminal and receives the configuration short message containing the access point and application information from the sending-party mobile terminal, extract the access point and application information in the configuration short message, and perform local configuration according to the extracted access point and application information:
wherein the configuration short message generating module is further configured to:
when the mobile terminal serves as the sending-party mobile terminal, obtain the access point and application information in the current network by reading the configuration information of the terminal, encode the access point and application information to obtain an access point and application information document, construct a short message which is identified by "special type", as the configuration short message, take the access point and application information document as data contents of the configuration short message, and send the configuration short message to the receiving-party mobile terminal in the same network.

7. The mobile terminal according to claim 6, wherein the configuration short message generating module includes: a document generating unit and a configuration short message constructing unit, wherein
the document generating unit is configured to: when the mobile terminal serves as the sending-party mobile terminal, obtain the access point and application information in the current network by reading the configuration information of the mobile terminal, and encode the access point and application in accordance with a format "Configuration Item: Configuration Value" to obtain the access point and application information document;
the configuration short message constructing unit is configured to: construct the short message which is identified by "special type", as the configuration short message, take the access point and application information as the data contents of the configuration short message, and send the configuration short message to the receiving-party mobile terminal in the same network.

8. The mobile terminal according to claim 6, wherein the configuration short message processing module is further configured to:
when the mobile terminal serves as the receiving-party mobile terminal, extract the access point and application information document from the data contents of the received configuration short message, decode the access point and application information document, and perform the local configuration according to the access point and application information obtained by the decoding.

9. The mobile terminal according to claim 8, wherein the configuration short message processing module comprises: a configuration short message analyzing unit and a configuring unit, wherein
the configuration short message analyzing unit is configured to: when the mobile terminal serves as the receiving-party mobile terminal, extract the access point and application information document from the data contents of the configuration short message after determining that the received short message is the configuration short message;
the configuration unit is configured to: decode the access point and application information document to obtain the "Configuration Item: Configuration Value" corresponding to the access point and application information, and perform the local configuration according to the "Configuration Item: Configuration Value".

* * * * *